Figure 1:
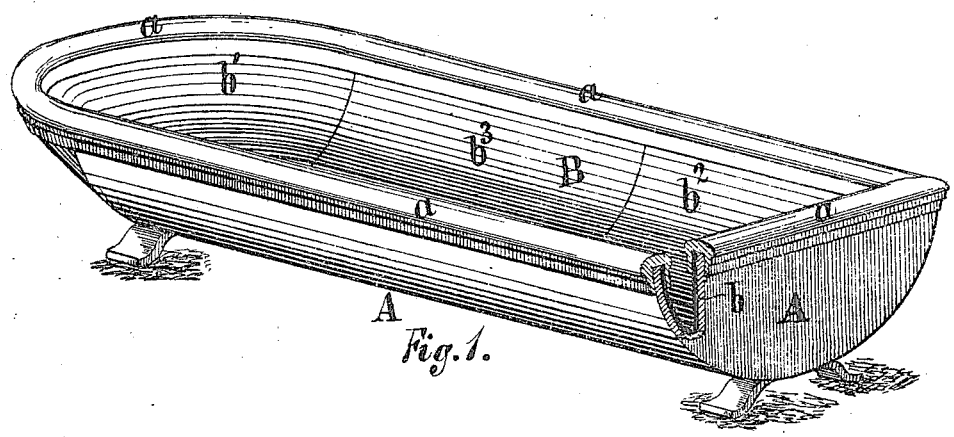

L. W. WERNER.

Depurator.

No. 134,406.

Patented Dec. 31, 1872.

WITNESSES:
Robert Burns.
Charles Meisner.

INVENTOR:
Louis W. Werner.
per. Herthel & Co,
attys.

UNITED STATES PATENT OFFICE.

LOUIS W. WERNER, OF ST. LOUIS, MISSOURI.

IMPROVEMENT IN DEPURATORS.

Specification forming part of Letters Patent No. 134,406, dated December 31, 1872.

*To all whom it may concern:*

Be it known that I, LOUIS W. WERNER, of St. Louis, in the county of St. Louis and State of Missouri, have made a certain new and useful Improved Depurator; and I do hereby declare that the following is a full and true description thereof, reference being had to the accompanying drawing and to the letters of reference marked thereon.

The object of this invention is to form an improved depurator or bathing-vessel, which can be more readily cleansed and kept at all times in a more clean and healthy condition than the ordinary metallic vessels of this nature. This invention, therefore, consists in lining or providing the interior of a depurator with glass or similar transparent material, the glass or transparent layers used being properly formed to conform to the interior shape of the body of the depurator, and embedded in cement, and otherwise properly attached to the body of the vessel.

To enable those herein skilled to make and use my said improvement, I will now more fully describe the same, referring to Figure 1 as a perspective view.

A represents the body of an ordinary wooden and metallic bathing-tub. B represents glass or transparent layers lining the interior of the body A. The glass lining consists of sectional layers, constituting the opposite ends $b$ $b^1$ and middle layers $b^2$ $b^3$, as indicated in the figure, said glass layers conforming to the shape required, and also formed of sufficient strength and thickness to resist pressure. In order to secure the glass, the same is embedded in a bed of suitable cement, with which the body A is provided. Further, in order that the cement shall not darken the transparency of the glass, the back of the same can be painted, stained, quicksilvered, or sheets of paper, linen, or other ordinary medium can be pasted or attached to the glass, and made to interpose as a layer between glass and cement. A top rim, $a$, fitted by its flanges, secures the top of the glass with metal by capping the top edges of same, as shown in Fig. 1; or otherwise the glass can be properly secured by the wooden framing that usually incases the outside of the metallic vessel. The interior of the depurator can be beautified, as desired, by providing the glass with configurations, or otherwise using "transfer ornamental" glass.

It is evident that the impurities escaping from the body during act of depurating can more readily be scoured from the glass surface; and thus my improved depurator can at all times present a tidy, neat, and more healthful appearance, advantages readily apparent.

Having thus fully described my said invention, what I claim is—

1. An improved depurator, lined, or providing the interior body of the same with glass or transparent layers, substantially as and for the purpose set forth.

2. The entire body A of a depurator having glass B or sectional layers $b$ $b^1$ $b^2$ $b^3$, with or without interposing mediums, and embedded in a bed of cement, as and for the purpose set forth.

In testimony of said invention I have hereunto set my hand.

LOUIS W. WERNER.

Witnesses:
    WILLIAM W. HERTHEL,
    ROBERT BURNS.